United States Patent Office 3,331,804
Patented July 18, 1967

3,331,804
RUBBER CEMENT COMPRISING E.P.D. RUBBER AND A PARA-NONYL SUBSTITUTED PHENOL-ALDEHYDE NOVOLAK RESIN
Adolf Wojciech Fogiel, Wilmington, Del., assignor to E. I. du Pont de Nemours and Company, Wilmington, Del., a corporation of Delaware
No Drawing. Filed Oct. 15, 1964, Ser. No. 404,170
1 Claim. (Cl. 260—33.6)

This invention relates to a new coating composition and, in particular, its use as a tackifying cement to impart extremely high "green bond strength" between contiguous surfaces of sulfur-curable chain-saturated hydrocarbon elastomers.

Normally-solid, chain-saturated α-olefin hydrocarbon copolymers containing a small amount of sulfur-curable side-chain unsaturation are becoming increasingly important today for making a variety of useful products. For broader acceptance however, they need better building tack. Many commercial processes require elastomeric components which can readily adhere to each other when pressed together. A particularly important example is tire building. Any commercially acceptable tire process presupposes that the components used have adequate tack. This property is defined here as the ability of two elastomer surfaces to stick together, when contacted, with a force which is sufficiently high to oppose delaminating forces appearing during the fabrication but low enough to permit clean separation prior to cure if the need arises. When one undertakes to construct a tire from elastomers having poor tack, the fabrication takes several times as long to finish as it would if very tacky rubber were used. For this reason it is apparent that it is highly desirable to have an adhesive which not only allows one to obtain a strong bond after cure, but also imparts building tack to facilitate construction of the composite assembly before vulcanization. Unfortunately, all synthetic elastomers of the commercially available grades are deficient in tack. In order to construct a whole tire from these elastomers or to use them as recaps or white walls, adequate building tack must be produced by some means that will have no deleterious effect on other properties (such as the adhesive bonding of the cured plies).

It has unexpectedly been found in accordance with this invention that the building tack of α-olefin hydrocarbon copolymer elastomeric substrates can be greatly improved without adverse effect on adhesive strength after cure by applying to the surface a coating composition comprising:

(I) A sulfur-curable, chain-saturated hydrocarbon copolymer of at least one straight-chain α-monoolefin and at least one non-conjugated diene, having a Mooney viscosity of at least 40 (ML–4/250° F.);

(II) Carbon black; and (III) A normally-solid, thermoplastic tackifying resin of limited compatibility with (I) and having a melting point below about 180° F., selected from the group consisting of (a) thermoplastic para-alkyl-substituted phenol-aldehyde type resins and (b) mixtures of esters of hydrogenated rosins in combination with minor proportions of thermoplastic para-alkyl-substituted phenolic resins of high incompatibility with (I);

(IV) 40–160 parts per 100 of (I) of a naphthenic processing oil; all highly dispersed in (V) A volatile inert solvent;

wherein:

(1) the weight ratio of (III) : (I) ranges from about 98:2 to 70:30, except that it shall range down to about 60:40 if there is present at least 10 parts of zinc oxide per 100 parts of (I); or if 100 parts of the elastomeric substrate contains at least 2 parts of said highly incompatible tackifying resin;

(2) when the average particle size of the dispersed carbon black (II) is not above about 0.2 micron, there shall be at least 50 parts of carbon black per 100 parts of copolymer (I);

(3) when the average particle size of the dispersed carbon black is greater than about 0.2 micron, the composition shall include about 2 to 10 parts of supplementary polymer (VI) per 100 parts of copolymer (I), selected from the group consisting of butyl rubber, natural rubber, and chlorosulfonated polyethylene and the weight of carbon black shall be at least equal to the sum of the weights of (I) and (VI).

In order to use the novel composition one merely applies it to the surface of an α-olefin substrate and allows the volatile solvent to evaporate. The coating thus deposited meets two critical requirements: improves the tack yet does not interfere with the cure. Since the coating imparts high surface tack to the substrates, they can be positioned securely together to form composite articles for curing. Advantageously, the coating allows the assemblies to develop adhesive bonds during curing that are strong and resistant toward aging.

The α-olefin copolymers which are employed as component (I) are made from at least one α-monoolefin, preferably ethylene, and at least one non-conjugated diene. The α-monoolefins are those having the structure R—CH=CH$_2$ where R is H or C$_1$–C$_{16}$ alkyl, preferably straight-chained. Representative dienes include: open-chain C$_6$–C$_{22}$ dienes having the structure

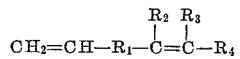

where R$_1$ is an alkylene radical, R$_2$, R$_3$, and R$_4$ are independently selected from the group consisting of hydrogen and alkyl radicals; dicyclopentadiene; 5-methylene-2-norbornene; 5-alkenyl-2-norbornenes; 2-alkyl-2,5-norbornadienes; cyclopentadiene; and 1,5-cyclooctadiene.

Representative procedures for making copolymers using these α-monoolefins and typical dienes are given in U.S. Patents 2,933,480; 3,000,866; 3,063,973; 3,093,620 and 3,093,621. When cyclic non-conjugated dienes are employed, it is preferred that the reaction mixture contain ethylene and at least one other α-monoolefin, such as propylene. The ethylene copolymers should contain about 20 to 75 weight percent ethylene monomer units if they are to be rubber-like.

Any sulfur-curable α-olefin copolymer of the above-described type will give a peak performance in the subject composition when its proper proportion relative to tackifier (III) has been determined by routine testing. The best copolymer to use will depend upon the nature of the end use contemplated for the composite article made by joining the coated elastomers to each other. Sometimes it is preferable that the copolymer used for component (I) be the same as the copolymer being coated. Thus, an ethylene/propylene/1,4-hexadiene copolymer may be preferred when coating a stock containing that copolymer. A particularly important feature is the Mooney viscosity of the copolymer (I). The viscosity which gives the best results can be determined by those skilled in the art by routine experiments. For tire building, it appears that the copolymers should have a Mooney viscosity (ML–4/250° F.) of about 70 or above, polymers having Mooney values as low as 40 can be employed, however.

The crux of the present invention is the use of critically selected thermoplastic resins in combination with a highly dispersed carbon black-compounded sulfur-curable α-olefin copolymer, the weight ratio of the resin to the copolymer being very high. It is surprising to be able to employ a resin-rich tackifying composition because the resin-rich compositions have never been used in the past for imparting building tack to elastomeric articles that must not only adhere well to each other on contact but also produce a strong bond upon curing. The tackifier component (III) and its weight ratio to the α-olefin copolymer (I) are critically important for obtaining adequate tack. It is believed that (III)'s ability depends on its limited compatibility with the compounded α-olefin copolymer. When tackifier (III) is highly incompatible, i.e., very insoluble in the copolymer, the resulting composition does not improve the tack of the coated surface adequately. When a tackifying resin is used which is similar (e.g., in hardness and melting point) but displays only limited compatibility with copolymer (I), a soft shiny coating results which provides excellent tack.

As mentioned above, an important feature of the present invention is the presence of carbon black. High abrasion furnace black is a representative example of a preferred material. Fine extrusion furnace black is also satisfactory. The black must be of the reinforcing type, e.g., HAF, FEF, and EPC black. The amount of carbon black needed depends on several factors. If the carbon black is very finely dispersed, i.e., its average particle size in the coating composition is no greater than about 0.2 micron, the weight of carbon black employed is at least about half that of the α-olefin copolymer (I). The preferred concentration, however, is about 150 parts per 100 parts by weight of copolymer (I). The compositions having low carbon black concentrations tend to display better quick tack than those having greater concentrations; however, the more important feature of a good tackifying composition is the high peel strength of the "green" stock (the coated substrate prior to cure). Higher concentrations of carbon black in the coating tend to improve the peel strength of the laminate. When the carbon black is less finely dispersed, i.e., exhibit an average particle size of about 1 micron, the α-olefin copolymer must be admixed with about 2 to 10 parts per 100 of the supplementary polymer (VI) and the weight of carbon black must be at least equal to the total weight of these elastomeric components. The presence of the incompatible supplementary polymer (VI) necessitates the increase in the carbon black concentration in order to obtain optimum tack at a particular tackifier to polymer ratio; at the same time, the high carbon black concentration improves the aging characteristics of the cured composite articles.

Success in using the present composition is critically dependent upon proper dispersion of the carbon black in the α-olefin copolymer (I) and, when used, the supplementary polymer (VI). Poor results have been observed when the α-olefin copolymer and the carbon black were mixed in the solvent by ball milling techniques. However, even when particularly efficient mixing devices such as homogenizers are employed, the adhesion and the tack are not as good as one obtains by dry mixing the polymer and the black and subsequently dispersing the mixture in a solvent with a homogenizer. Thus, it is distinctly preferred that the carbon black be mixed with the polymer by solid compounding techniques such as on a rubber roll mill or, preferably, in an internal mixer such as a Banbury mixer or a Struthers-Wells mixer. In general, it appears that the polymer and the carbon black must adhere well to each other if the composition is to provide adequate "green" and cured bond strength.

The supplementary polymers (VI) are selected from the group consisting of butyl rubber, natural rubber, chlorosulfonated linear polyethylene, and mixtures thereof. The need for the presence of minor amounts of this supplementary polymer in the compounded stock to obtain adequate tackifying property is not entirely understood. It is thought that it might be due to modification of the compatibility of the tackifying resin (III). The above group of supplementary polymers is selected to give optimum results. It should be understood that other polymers can be substituted for these additives but the overall tack and "green" bonding and the adhesive strength of the composite article after curing are not as satisfactory.

Polyisobutylene having a molecular weight of about 85,000 and a Mooney viscosity of 100 (ML-4/250° F.) provided a coating composition giving excellent tack, but the cured article displays poor bond strength. In a similar fashion, polyethylene ("Philube" containing 88% mineral oil plus linear polyethylene and a lithium soap) gave good tack, but interfered with the desired aging characteristics of the cured adhered bond. Polypropylene of molecular weight 1,000 was not fully satisfactory; in contrast to the alternatives just mentioned, this compound resulted in poor tack but allowed a good cured bond to be attained. Fluid polyisobutylene having a molecular weight of about 10,000 gave a cement providing poor tack, but it did not interfere with the cured bond strength.

The outstanding supplementary polymer (VI) is butyl rubber. Examples include "Butyl 325" and "Butyl HT." As is well known, these products are made by reacting isobutylene with very minor amounts of isoprene sufficient to provide sites for sulfur cure. "Butyl HT" is a chlorinated butyl rubber containing 1.2% chlorine. Another example of a suitable polymer is natural rubber (smoked sheet) or the synthetic equivalent cis-poly-1,4-isoprene.

The determination of whether polymers are compatible or not can be difficult. One approach is to prepare separate solutions of the polymers in a common solvent and thereafter mix the solutions carefully. If cloudiness is observed, there is a good chance that the polymers are incompatible in the bulk (dry) phase. Observations may require as long as two weeks; in some instances two clear liquid layers will form. Complications arise because one cannot conclude with certainty that the polymers are compatible if a clear solution results after the mixing. In certain instances compatibility can be tested by comparing the glass transition temperature of a polymer mixture with the glass transition temperature values of the individual components. Thus, it was observed that the glass temperature of natural rubber was −65° C., that of an ethylene/1,4-hexadiene copolymer was −48° C., where that of 50:50 mixture was −58° C. It was concluded that the polymers were compatible (at least in the proportions tested).

As mentioned above, a very important component in the composition of the present inventon is the tackifier (III). One general class of tackifiers includes the aldehyde/para-alkyl substituted phenol condensation products made under acidic conditions. These tackifiers should exhibit limited incompatibility in the mixture of α-olefin polymers (I) and carbon black. Furthermore they should have melting points below about 80° C. in order that the surfaces which have been coated and joined develop adequate bond strength during the cure. Importantly, these tackifiers are characterized in being thermoplastic and thermostable since they have no methylol groups and $-CH_2-O-CH_2-$ bridges in contrast to the resoles prepared under basic conditions. A typical resin has the following idealized structure:

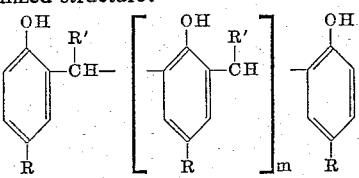

where R is alkyl and R' is H or lower alkyl. A particularly preferred resin is "CRRB-0709" (commercially available from Union Carbide Corp.). It is believed that in this compound m is about 8 to 10, R can be isomers of branched nonyl and R' is H. These compounds are made by reacting a mixture of isomeric para-nonyl phenols with formaldehyde. A similar resin is the "Catalin Resin 9647" (commercially available from Catalin Corp. of America).

A critical feature of the present invention is the relative proportion of tackifier (III) and the α-olefin copolymer (I) (and the supplementary polymer (VI) when present). In general the value of the weight ratio of tackifier to total polymer should be in the range 70:30 through 98:2. If lower proportions of tackifier are present, except as noted, the coating composition does not perform adequately. When the proportions are about 70:30 the tack has been found to be about borderline. When, however, 10 or more parts of zinc oxide are present in the mixture of (I), (II), and (III), the ratio is preferably about 60:40. The low ratio is also desirable if the polymer substrate being coated has 2 or more phr. of highly incompatible tackifying resin (e.g., "Amberol ST–137X") incorporated in it. The upper limit of the tackifier concentration is determined by the decrease in the tack provided by the composition and by the behavior of the bond between the coated joined surfaces after curing.

The concentration selected by those skilled in the art will provide the best possible balance of properties for the coating composition, i.e., the tack of the coated substrate, the bond strength formed after curing, and the resistance of this bond to degradation by heat aging.

When the ratio of tackifier to polymer is very high (95:5 through 85:15), the presence of zinc oxide and accelerators in the adhesive improve the tack; unfortunately, the 100° C. aging stability of the cured adhered bond is decreased. When the value of the tackifier:polymer ratio is lower (for example, to 75:25), the cured adhesion bond becomes less sensitive to the presence of zinc oxide and also, to the thickness of the coating. Fortunately the presence of zinc oxide still causes a definite improvement in tack as compared with cements containing no zinc oxide; it appears that the higher the concentration of zinc oxide, the better the tack at least up to about 10–20 parts per hundred of zinc oxide. Example 3 illustrates the use of an adhesive wherein the tackifier to polymer ratio is 75:25 and wherein 10 parts of zinc oxide are present. A similar result was obtained for tackifier to polymer ratio of 60:40, but much poorer tack was obtained for tackifier:polymer ratio of 50:50.

Part of the preferred resin can be replaced by phenol/aldehyde resins that are apparently more incompatible with the compounded copolymer, (as determined by a haze of films composed of the resin and gum rubber at room temperature; ASTM test D1003–59T).

These resins can be represented by the same general formula as those above except that the values of R and R' are such that the resin is less compatible with the α-olefin copolymer. A representative resin is "Amberol ST–137X" (commercially available from Rohm and Haas). In this resin R is a branched 1,1,3,3-tetramethylbutyl group, $m$ is 1.8 to 2, and R' is H. (A similar resin is "Catalin Resin 8318.") This resin gives strength to the stock. The proportion of the preferred resin which can be replaced by the less compatible resin apparently depends upon the proportion of the α-olefin hydrocarbon polymer (I) (and the supplementary (VI) polymer when present). For compositions having a large proportion of α-olefin copolymer, (e.g., where the weight ratio of resin to polymer is 70:30) about 10–30% of the preferred tackifier (III) may be replaced. Those compositions very rich in tackifier, e.g., compositions having 98 parts of resin and 2 parts of polymer, can be modified by replacing up to 40% of the preferred tackifier with the less compatible resin.

The second class of thermoplastic tackifying resins of limited compatibility with α-olefin hydrocarbon copolymer (I) includes esters of hydrogenated rosin in conjunction with small amounts of thermoplastic alkyl-substituted phenolic resins of high incompatibility. As is well known, rosin is the non steam-volatile fraction of pine oleo-resin and is a mixture of 5 isomeric diterpene acids of the formula $C_{19}H_{29}OC_2H$. Abietic acid is the most abundant component. Rosin is further described in the book "Natural Products Related to Phenanthrene," Fieser and Fieser, third edition, Reinhold Publishing Corp., 1949, chapter II.

The selected tackifying resins are (1) glycerol esters of hydrogenated rosin (for example, "Staybelite" ester commercially available from Hercules Powder Company). For best results this ester should be used with a small quantity (10–30% of the total tackifying resins) of a thermoplastic or mildly heat-reactive phenolic resin which is highly incompatible with the compounded stock. An example of the thermoplastic resin is "Amberol ST–137X" mentioned above. An example of a mildly heat reactive phenol/formaldehyde resin is "Amberol ST–137" which is believed to have terminal methylol groups and differs from the X compound in that at least part of the bridges have oxygen atoms in them of the type

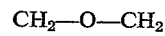
$$CH_2\text{—}O\text{—}CH_2$$

A similar compound is "CRR803" (commercially available from Union Carbide Corp). Heat reactive phenolaldehyde type resins are more particularly described in Phenoplasts: Their Structure, Properties, and Chemical Technology, T. S. Carswell, vol. VIII of High Polymers, Interscience Publishers, Inc., New York, pp. 6–73, 204–207; W. A. Pardee and W. Weinrich, Ind. Eng. Chem. 36, 595–603 (1944); E. C. Britton, Ind. Eng. 33, 965 (1941); V. H. Turkington and I. Allen. Ind. Eng. Chem. 33, 966–971 (1941); U.S. Patents 1,996,069; 2,364,192; 2,963,462 and 2,972,600.

Another example of a resin of limited compatibility is the Catalin Resin 10093 wherein R is branched nonyl, and R' is methyl. This material contains 4.61% by weight hydroxyl groups and melts at 71.5° C.

Another critical constituent of this composition is a naphthenic process oil. It must be present to the extent of at least 40 parts per 100 parts of the copolymer (I). Preferably, 60 to 120 parts is used in many instances. An average of about 80 parts per 100 parts of (I) is usually adequate. When more than 160 parts of naphthenic process oil per 100 parts of (I) is used, cured adhesion is impaired. It is believed that the naphthenic process oil has an effect on the compatibility or incompatibility of the resin and the copolymer.

In addition to the above-described critical components the composition of the present invention can contain optional components such as accelerators for sulfur cure, zinc oxide, and the like.

As mentioned above, in order to obtain satisfactory results the composition of the present invention should be prepared in as homogeneous a fashion as possible. Thus, the α-olefin hydrocarbon copolymer (I), the carbon black, and any supplementary polymer (VI) must be dry mixed before being dispersed in the organic solvent in a homogenizer (or less preferably a ball mill). Optionally, the organic solvent may have the resin already dissolved in it. More often, tackifier (III) is introduced afterward into the dispersion of the polymer and black in any conventional agitated vessel.

The inert organic liquid can be any solvent or mixture of solvents used conventionally to dissolve the polymeric components of the adhesive. The best solvent system for a particular combination of polymers can be determined by routine selection and testing. Aliphatic hydrocarbons such as n-hexane, cycloaliphatic hydrocarbons such as cyclohexane, and aromatic hydrocarbons such as benzene are representative examples of the media often selected for hydrocarbon polymers; trichloroethylene is the preferred medium. The amount of inert organic liquid can vary over a wide range and is largely determined by the particular requirements for each application.

In the compositions of the present invention, it is essential that the solids concentration be very low. Thus, the total solid concentration typically ranges from about 2–10%, but preferably about 5%. By total solids is meant both the α-olefin hydrocarbon copolymer, the carbon black, the resin, and the optional supplementary polymer. In the final coating composition the polymers are at a concentration of about 0.2–1% by weight.

The adhesive is applied in the conventional manner familiar to those skilled in the adhesive art; brushing, rolling, spraying, swabbing and the like can be employed to spread the adhesive across the surface of the α-olefin copolymer substrate. The thickness of a particular coating needed will be somewhat a function of the solids content of the dispersion supplied; it is generally preferred that the amount of the adhesive supplied be sufficient to leave a dry coating about 4 milligrams/sq. inch to 10 milligrams/sq. inch thick. Those skilled in the art can determine by routine testing the best thickness to use for a particular application.

After the coating has been applied the volatile solvent is removed by evaporation. About 30 to 120 minutes may be required at 25–30° C.; higher temperatures will shorten the time. When dry, the coated article is ready for use. As previously noted, the substrates to be coated and joined are α-olefin hydrocarbon copolymers, e.g., an ethylene/propylene/1,4-hexadiene copolymer as described in the examples. Once the tacky coated surfaces have been pressed together, they remain well fixed. The procedures for assembling the composite articles will be selected by those skilled in the art to suit the particular application. The assembly is cured by heating under pressure (typically 100–500 lbs./sq. in.).

The curing temperature used can generally be selected from those values recommended in the art for sulfur-curable α-olefin copolymers. Temperatures generally range between about 130 and 160° C. with about 150 to 160° C. being preferred. Cure times will range between about 15 to 45 minutes. The time will vary inversely with the temperature, higher temperatures usually requiring shorter cure times. Those skilled in the art can determine the best time by routine testing taking into account such factors as the conditions recommended in the art for the particular curing system being used.

As mentioned above, elastomeric substrates can be bonded by interposing the adhesive system of the present invention between them and thereafter subjecting the assembly to curing conditions. In particular, the adhesive is useful for joining substrates made from sulfur-curable, normally-solid, chain-saturated α-olefin hydrocarbon copolymers. The α-olefin copolymers are made by reacting at least one α-mono-olefin and at least one non-conjugated hydrocarbon diene. Any of the above-described α-olefin copolymers (I) is suitable. The adhesive is most beneficial for use on articles made from copolymers having Mooney viscosities (ML–4/250° F.) above about 40; particularly those having Mooney viscosities of about 70.

The elastomers being adhered by the novel composition of the present invention are compounded with appropriate curing agents. Thus, any of the above-described sulfur (or peroxide) curing systems can be added to the α-olefin hydrocarbon copolymer containing side-chain unsaturation (e.g., ethylene/propylene/1,4-hexadiene). It is to be understood that various modifications of the sulfur curing procedures may be employed depending upon the stock. Various procedures and modifications of sulfur curing are more particularly described in Encyclopedia of Chemical Technology, Kirk and Othmer, published in Interscience Encyclopedia, Inc., New York, 1953, vol. 11, pages 892–927; Principles of High-Polymer Theory and Practice, Schmidt and Marlies, published by McGraw-Hill Book Co., New York, 1948, pages 556–566; Chemistry and Technology of Rubber, Davis and Blake, published by Reinhold Publishing Corp., New York, 1937, chapter 6; Introduction to Rubber Technology, edited by M. Morton, Reinhold Publishing Corp., New York, 1959, pages 93–129; The Applied Science of Rubber, edited by W. J. S. Naunton, Edward Arnold, Ltd., London, 1961, pages 346–413, 992–1099; Vulcanization of Elastomers edited by G. Alliger and J. J. Sjothun, Reinhold Publishing Corp., New York, 1964, pages 3–194, 305–333.

The sulfur curing system which can be present in the novel adhesive composition contains a metal oxide, a curing accelerator and optionally sulfur. About 0.2 to 2, preferably 0.75 to 2 parts of sulfur are present for every 100 parts by weight of the α-olefin copolymer. Concentrations above 2 parts are usually unnecessary. The concentration of the metal oxide is important since it, in conjunction with sulfur and accelerator, controls the ultimate state of bonding. At concentrations of 3 to 10 parts by weight of metal oxide (preferably, zinc oxide) per 100 parts by weight of the copolymer, the rate and state of cure are very satisfactory. Concentrations below 2 parts per 100 are sometimes less satisfactory for developing and maintaining adequate vulcanizate properties and concentrations above 10 parts per 100 are generally unnecessary. The best accelerators for the vulcanization are also the ones used for curing natural rubber. The most active accelerators include 2-mercaptobenzothiazole, thiuram sulfides, dithiocarbamates, and very similar derivatives. The thiuram sulfides and the dithiocarbamates are generally preferred because they produce rapid curing without attendant scorching and develop and maintain maximum physical properties even on extended curing cycles. Alternatively, however, 2-mercaptobenzothiazole and its derivatives, alone or in combination with thiurams or dithiocarbamates provide adequate acceleration with processing safety. Representative accelerators include: tetramethyl thiuram monosulfide; tetramethyl thiuram disulfide; tellurium diethyldithiocarbamate, the zinc salt of dimethyldithiocarbamic acid; the piperidine salt of pentamethylenedithiocarbamic acid; 2-mercaptobenzothiazoline; 2-mercaptobenzothiazole; N,N-diethylthiocarbamyl-2-mercaptobenzothiazole, and 2,2′-dithio-bisbenzothiazole. A representative and preferred accelerator includes tellurium diethyldithiocarbamate (1.5 parts) or tetra-methylthiuram disulfide (0.75 part). Those skilled in the art can select by routine empirical experiments the best combinations of accelerators when curing a particular assembly. In addition to the above-described components, the novel composition may include such optional components as conventional antioxidants.

Sulfur curing systems need not be employed in the coating compositions if diffusion of the necessary materials from the substrate can be effected.

The invention will now be described with reference to the following examples of specific embodiments thereof wherein parts and percentages are by weight unless otherwise specified.

The below listed materials employed in the examples are prepared as follows:

α-Olefin hydrocarbon elastomer

The α-olefin hydrocarbon elastomer is prepared according to the general procedure of U.S. Patent 2,933,480 by copolymerizing ethylene, propylene, and 1,4-hexadiene in tetrachloroethylene in the presence of a diisobutyl aluminum monochloride/vanadium oxytrichloride coordination catalyst. The copolymer exhibits a Mooney viscosity (ML–4/250° F.) of 70 and has the following composition (by weight): 52% ethylene units, 44% propylene units, and 4% 1,4-hexadiene units.

Butyl rubber

An isobutylene dipolymer (commercially available from Enjay Chemical Company as "Butyl 325") contains 2.1–2.5 mole percent isoprene units and displays a Mooney viscosity (ML–8/212° F.) in the range 41–49.

Naphthenic petroleum oil

A naphthenic petroleum oil ("Flexon 765," alternatively called "Necton 60," commercially available from Humble Oil & Refining Company) had the following characteristics:

| | |
|---|---|
| Flash point, °F. | 445 |
| N-bases _____percent__ | 0 |
| 1st acidaffins _____do____ | 1.5 |
| 2nd acidaffins _____do____ | 28.3 |
| Paraffins _____do____ | 70.2 |
| Specific gravity (60/60° F.) | 0.8980 |
| Saybolt viscosity (210° F.) _____sec__ | 58 |
| Viscosity-gravity constant | 0.834 |
| Percent aromatic ring carbons | 0 |
| Percent naphthenic ring carbons | 45 |
| Percent paraffinic chain carbons | 55 |

Preparation of tread and carcass stocks

Tread and carcass stocks, all principally based on the high viscosity α-olefin hydrocarbon copolymer described above, are prepared by compounding the following ingredients on a rubber roll mill at 75–100° F:

| Ingredient | Parts | |
|---|---|---|
| | Tread | Carcass |
| High-Mooney α-Olefin Copolymer | 100 | 100 |
| Zinc Oxide | 5 | 5 |
| Stearic Acid | 1 | 1 |
| HAF Carbon Black | 72 | 72 |
| Naphthenic Petroleum Oil | 40 | 40 |
| Sulfur | 1.75 | 1.5 |
| Tetramethyl thiuram monosulfide | 1.5 | 1.5 |
| 2-mercaptobenzothiazole | 0.75 | 0.75 |

Thermoplastic tackifying resin A

This is an oil-soluble thermoplastic resin ("CRRB–0709," commercially available from Union Carbide) having a melting point of 80° C., a hydroxyl equivalent of 216, and a molecular weight of 1948 (freezing point depression) or 2529 (boiling point elevation). Analysis: carbon, 82.9%; hydrogen 10.9%; and oxygen, 6.3%. The NMR spectrum shows ratio of aromatic H to methylene H to p-alkyl H=2:1.75:18.75. This resin can be made by reacting slightly less than a mole of formaldehyde with a mixture of isomeric branched p-nonyl substituted phenols in the presence of acid. A representative resin molecule is believed to have the following structure

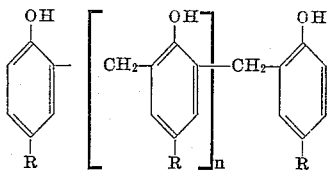

where R is nonyl and $n$ is an integer of about 8 to 10.

Thermoplastic tackifying resin B

This is an oil soluble thermoplastic resin (commercially available from Rohm & Hass as "Amberol ST–137X") which can be made by reacting slightly more than a mole of a branched p-1,1,3,3,-tetramethylbutyl substituted phenol with a mole of formaldehyde in the presence of acid. The resin melts in the range 65–75° C. and has a hydroxyl equivalent of 197. Analysis (by weight): 81.6% C.; 10.3% H.; 8.28% O. Typical molecules have the same general structure as Resin A; however, in the gross resin mixture making up Resin B, essentially all the molecules contain the same isomeric octyl group.

Rosin ester A

This rosin ester ("Staybelite Ester," commercially available from Hercules Powder Company) is a glycerol ester of hydrogenated rosin; its melting point is 58–63° C.

Rosin ester B

This rosin ester ("Cellolyn 21," commercially available from Hercules Powder Company) is a phthalate ester of technical dihydrobietyl alcohol, its melting point is approximately 35° C.

Preparation of substrate samples for coating and testing

For reproducible results, a smooth surface is obtained by molding the substrate, e.g., tread stock, in a press at about 70° C. between a polyethylene terephthalate film ("Mylar") and a backing cloth. The thickness of the substrate is about 50 mils for tack measurement and about 80 mils for the determination of the cured adhesive bond. For tack determination, the backing is an ordinary cotton duck canvas which is adhered adequately by pressure. For the cured bond determination, a nylon cloth backing is employed. Prior to use the nylon cloth is treated with a resorcinol/formaldehyde aqueous tire cord dip and after drying is given a coat of a brominated ethylene/1,4-hexadiene copolymer cement. Strong adhesion of cloth to substrate is necessary when the sample is employed and the 180° peel test of cured plies having a high adhesion bond.

Application of the adhesive composition of the present invention to tread and carcass stocks A camel hair brush loaded with the adhesive composition is drawn across the substrate as lightly as possible in 2 opposing strokes. For tack measurements, 0.5 x 6-inch strips of adhesive are applied by a 0.5-inch brush. For cured bond measurements, 1.25 x 6-inch strips of adhesive are deposited with a 1-inch brush. A fairly reproducible coating thickness (±15%) is attained. In both cases about 4–5 milligrams of solids are deposited for every sq. in. of the substrate surface. This coating thickness is adequate for good tack. An alternative coating procedure, namely two quick dips of substrate in the coating composition, yields approximately the same thickness of coating.

Measurement of tack and cured ply adhesion

Although there are no standard methods to assign numbers to tack, two tests have been found to correlate very well with the performance of the rubber plies on the tire building drum.

(A) *Test for "quick tack" ("lift" test).*—A ¼ by 6" strip of a test material having a reproducibly smooth surface is placed on a ruler and held firmly at one end; a quick and light contact is made with a similar strip bent in the form of a loop. The better the tack of the material, the closer to the fulcurm can the loop lift the strip to a fixed height (about ½") and hold it there for a fixed period of time (3 sec.). The distance of attachment is counted from the free end of the strip, so that a high number (expressed in inches) indicates a high quick tack.

(B) *Test for peel strength.*—After the "lift" test has been finished, the test strips are well-aligned and plied by two hand rolling passes with an 8-lb. steel roller at a rate of about ½ second/inch. The plied strips are pulled apart at a 180° angle on an Instron machine (or other force-recording instrument) at the rate of 5" per minute. The separation is started exactly 30 seconds after the initial contact of the strips.

Measurement of cured bond 1.25 by 6" strips of the substrate are coated with the cement and dried. One ply is divided into sections by means of cellophane strips. The separation of the strip into four sections allows four tests to be made from one sample under different conditions. The sample is cut at the center. After the measurement on the freshly cured stock has been made in the first test area, the tear frequently has proceeded below the substrate surface. In order to make the measurement on the next section, it is necessary that the initial separation occur exactly at the interface. The thin strip of cellophane provides the means for separating the surfaces cleanly before the test is made.

Two plies coated with tackifying cement, one additionally containing the cellophane as described above, are brought in intimate contact and cured for 20 minutes at 160° C. under 200 lbs./sq. inch pressure in a plunger mold. No difference is found in adhesion whether the contact prior to curing is 15 min. or as long as 7 days. The cured strips are trimmed to a 1″ width and cut in half. One half is tested for peel strength at 25° C. and 121° C. without aging. The other is aged for 3 days at 100° C. in an air oven prior to the peel test. (Rate of separation is 2″/per min.).

EXAMPLE 1

The α-olefin hydrocarbon copolymer is compounded in a Banbury mixer (77 r.p.m.; initial temperature 140° F.) according to the following recipe:

| Component: | Parts |
|---|---|
| α-Olefin copolymer | 95 |
| Butyl rubber | 5 |
| HAF carbon black | 144 |
| Naphthenic petroleum oil | 80 |

The α-olefin copolymer and butyl rubber are mixed for one minute during which the temperature rises to about 280° F.; then the carbon black and petroleum oil are introduced. Mixing is continued for 2 minutes at 280° F.

⅜-inch cubes are cut from a 10.3-gram portion of the compounded stock obtained, placed in a 16-oz. jar, and covered with a 200-ml. portion of hexane. After an equal volume of ceramic balls (⅜-inch to ½-inch diameter) has been added, the mixture is ball-milled on moving rollers at 25–30° C. for 72 hours.

The resulting dispersion is passed through a 200-mesh screen and diluted with a 200-ml. portion of hexane. The particle size of the dispersed carbon black is about 1 micron. The total solids content is about 2.58% weight per volume (i.e., about 2.58 grams of solid for every hundred cubic centimeter of the coating composition).

Coating compositions A and B are made by dissolving selected tackifying resins in 25-ml. aliquots of the above dispersion.

*Composition A.*—About 25 ml. of the diluted dispersion, 1.42 grams of tackifying resin A and 30 ml. of hexane are stirred together with moderate agitation. In the resulting composition the total solids concentration is about 3.8% weight/volume and the resin to polymer ratio (by weight) is about 87:13.

*Composition B.*—Made the same way as cement A except that 0.142 gram of resin A is replaced by 0.142 gram of resin B. Compositions A and B are both ready for use as soon as the resins are dissolved.

Separate samples of the α-olefin hydrocarbon polymer tread and carcass, described above are coated with compositions A and B to a thickness of about 4 mg. per sq. inch. For purposes of comparison uncoated controls were made.

The tack of the composite articles made by joining the tread stocks was as follows:

TABLE I.—ADHESION OF UNCURED TREAD-TO-TREAD PLY AT 25° C.

| Composition | "Lift" (inches) | Peel Strength (ply) |
|---|---|---|
| A | 4 | 4.3 |
| B | 3 | 6.2 |
| None (control) | 0 | 2.0 |

If, for comparison, the above procedure is repeated except that the butyl rubber is omitted from the recipe, the plies typically display about 3 inches lift and 2.0 to 2.7 ply peel strength.

To test the adhesion of cured plies, tread-tread, carcass-tread, and carcass-carcass plies are assembled by joining the coated slabs made above. The strength of the newly cured plies at 25 and 100° C. is determined; after the cured plies have aged for three days at 100° C. they are retested. Controls are run in which the tackifying cement is omitted for purposes of comparison. The bond strength displayed by the plies made from the slabs coated with the compositions A and B are found to be essentially as good in every case as those displayed by the respective controls illustrating that the tack has been significantly improved at no sacrifice of vulcanizate bond strength.

EXAMPLE 2

The need for the supplementary hydrocarbon polymer when the carbon black is coarsely divided in the cement was illustrated in Example 1. This example will show that if the carbon black has been very finely dispersed in the cement, the supplementary hydrocarbon polymer is not required for attainment of high tack.

Component I is blended in the Banbury mixer according to the following recipe.

| Component: | Parts |
|---|---|
| α-Olefin copolymer | 100 |
| HAF carbon black | 144 |
| Naphthenic petroleum oil | 80 |

After the stock has been mixed for 5 minutes at 62 r.p.m. the final temperature is about 335° F.

Two 26-gram portions of this stock are cut into small pieces and allowed to swell overnight in 200 ml. of trichloroethylene at 25–30° C. The next day each swollen stock is homogenized for 3 minutes in a 32-oz. jar (6.5 inches high, 4 inches in diameter) by means of an Eppenbach homomixer turned on at full speed (about 8,000 r.p.m.). The dispersions are then passed through a 200-mesh screen and combined in a 1-gallon jar.

Coating composition C is then prepared by introducing 63.62 grams of resin A and 27.26 grams of resin B and sufficient hexane into the dispersion to bring the total volume to 3,520 ml. Slight agitation dissolves the resin. In the resulting composition the particle size of the dispersed carbon is approximately 0.2 micron, the resin to polymer ratio is about 85:15, and the total solids concentration is about 4.05% weight/volume.

Composition C is then applied by the procedure of Example 1 to α-olefin hydrocarbon tread stocks and the tack is measured.

TABLE II.—ADHESION OF UNCURED TREAT-TO-TREAD PLY AT 25° C.

| Composition | "Lift" (inches) | Peel Strength (ply) |
|---|---|---|
| C | 3+ | Greater than 8.6. |

Carcass and tread stocks are coated with composition C to a thickness of about 8 mg./sq. in. and plies are made by bonding tread-tread and carcass-carcass stocks. The cured adhesive bonds displayed by the coated stocks are essentially the same as those of the corresponding controls both in the unaged and the aged samples at all the test temperatures.

EXAMPLE 3

This example illustrates the successful use of 10 parts of ZnO and a resin to polymer ratio of about 75:25.

The α-olefin copolymer is compounded on a rubber roll mill at 40° C. according to the following recipe.

| Component: | Parts |
|---|---|
| α-Olefin copolymer | 100 |
| Zinc oxide | 10 |
| HAF black | 144 |
| Naphthenic petroleum oil | 80 |
| Tetramethylthiuram monosulfide | 3 |
| 2-mercaptobenzothiazole | 1.5 |

First, the α-olefin copolymer is passed through the roll at 40° C. until a uniform continuous band is formed. At this point, carbon black and oil are alternately added in small portions as rapidly as the bank can absorb them. Finally, the remaining components are added.

Composition D is prepared by soaking a 27.1-gram portion of the composite stock overnight in 200 ml. of trichloroethylene at 25–30° C. The swollen mixture obtained is homogenized for 4 minutes at 25–30° C. in an Eppenbach homomixer operated at full speed. After the resulting dispersion has been passed through 200-mesh screen it is made up to 800 ml. with hexane. The solids concentration is about 2.95% (wt./vol.). About 20 ml. of hexane and 1.166 grams of tackifying resin A are added to a 50-ml. portion of the hexane composition. Brief agitation dissolves the resin. In composition D the total solids concentration is about 3.8% (wt./vol.) and the resin:polymer ratio about 75:25.

α-Olefin copolymer tread stocks, made as in Example 1 are given a 6 mg./sq. in. coating of Composition D and tested for tack at 25–30° C. The following results are typical:

TABLE III.—ADHESION OF UNCURED TREAT-TO-TREAD PLY AT 25° C.

| Composition | "Lift" (inches) | Peel Strength (ply) |
|---|---|---|
| D | 3+ | Greater than 8.6. |

An 8 mg./sq. in. coating of Composition D is applied to the α-olefin copolymer carcass stock. After plies are placed together and cured, the bonds are tested. The laminates before and after aging are so strongly adhered that tearing occurs (unaged at 25° C., 121° C.; aged at 25° C., 100° C.) at the cords rather than at the interface between the coated surfaces.

EXAMPLE 4

This example illustrates the use of rosin esters.

A 10.3-gram portion of stock compounded and cut by the procedure of Example 1 is soaked overnight in 100 ml. of trichloroethylene at 25–30° C. The swollen stock obtained is comminuted in an Osterizer blender operated at full speed for 3 min. The resulting mixture is then passed through a 200-mesh screen and made up to 400 ml. with additional trichloroethylene. The total solids concentration is about 2.58% (weight/volume). A 10-ml. aliquot is mixed with 1.330 grams of rosin ester A, 0.570% of tackifying resin B and 45 ml. of hexane. In the resulting composition E the total resin: polymer ratio is about 96:4 and the total solids concentration is about 3.92% (weight/volume).

An 8 mg./sq. inch coating of composition E is applied to the α-olefin copolymer tread stock. The following tack data is typical.

TABLE IV.—ADHESION OF UNCURED TREAD-TO-TREAD PLY 25° C.

| Composition | "Lift" (inches) | Peel Strength (ply) |
|---|---|---|
| E | 3 | 6.8 |

Plies are made by joining coated tread stocks and curing them. The cured adhered interfacial bond is too strong to separate; the unaged plies undergo stock tear instead at 25°, 121°, and 150° C. After aging for 3 days at 100° C. the stock exhibited some interfacial tear at 25° C.; at 100° C. interfacial tear occurred exclusively. The values in all cases are essentially the same as would be obtained for plies having no tackifying composition.

EXAMPLE 5

A 26-gram portion of the compounded stock described in Example 2 is cut up and allowed to swell overnight at 25–30° C. in 200-ml. of trichloroethylene. The mixture is then agitated for 3 minutes at 25° C. in an Eppenbach homomixer operated at full speed. The homogenized stock obtained is passed through a 200-mesh screen and made up to a 400-ml. volume with hexane. The solids concentration is about 6.5% (weight by volume). A 5-ml. aliquot of this product is, in turn, diluted with 50 ml. hexane and mixed with 1.33 grams of rosin ester B and 0.57 gram of tackifying resin B. Composition F thereby obtained has a solids concentration of about 4%; the ratio of resin:polymer is about 96:4.

A 6 mg./sq. in. coating of composition F is applied to the α-olefin hydrocarbon polymer tread stock described in Example 1. The following tack is typical:

TABLE V.—UNCURED ADHESION OF TREAD-TO-TREAD PLY AT 25° C.

| Composition | "Lift" (inches) | Peel Strength (ply) |
|---|---|---|
| F | 3 | 6.4 |

Tread stocks, given an 8 mg./sq. in. coating of composition F, are joined and cured. The unaged vulcanizate displays such strong bond strength that at 25° C., 121° C., and 150° C. the tear occurs in the stock rather at the interface between the surfaces. At 25° C. the heat aged plies display this behavior again; at 100° C. interfacial tear occurs. In all cases the cured adhesion bond is essentially that which would be displayed by the same composition in the absence of the cement.

As many widely different embodiments of this invention may be made without departing from the spirit and scope thereof, it is to be understood that this invention is not limited to the specific embodiments thereof except as defined in the appended claim, and all changes which come within the meaning and range of equivalence are intended to be embraced therein.

What is claimed is:

A coating composition comprising: (I) a sulfur-curable, chain-saturated hydrocarbon copolymer of ethylene, propylene and a non-conjugated diene having a Mooney viscosity (ML-4/250° F.) of at least 70; (II) at least 50 parts, per 100 parts of copolymer (I), of carbon black having an average dispersed particle size of not greater than about 0.2 micron; (III) a normally-solid, thermoplastic para-nonyl-substituted phenol-aldehyde resin of limited compatibility with copolymer (I); (IV) 60–120 parts of naphthenic process oil per 100 parts of (I); and (V) an inert volatile solvent; wherein: (1) the weight ratio of (III):(I) ranges from about 75:25 to about 60:40, said composition containing from about 10 to 20 parts of zinc oxide per 100 parts of copolymer (I).

References Cited

UNITED STATES PATENTS 3,262,482 7/1966 Clifton et al. _____ 156—335
3,294,866 12/1966 Soldatos _____ 260—845

FOREIGN PATENTS 876,697 9/1961 Great Britain.

OTHER REFERENCES

Burhams et al., Improved Synthetic Rubber Tack with Phenolic Resins, Rubber Age, 92, February 1963, pp. 745–748.

MURRAY TILLMAN, *Primary Examiner.*

M. J. TULLY, *Assistant Examiner.*